Nov. 24, 1931.  ST. CLAIR F. LUZZI  1,833,167
HYDRAULIC BRAKE FOR DRAW WORKS, DRUMS, AND HOISTS
Filed March 29, 1930  2 Sheets-Sheet 2
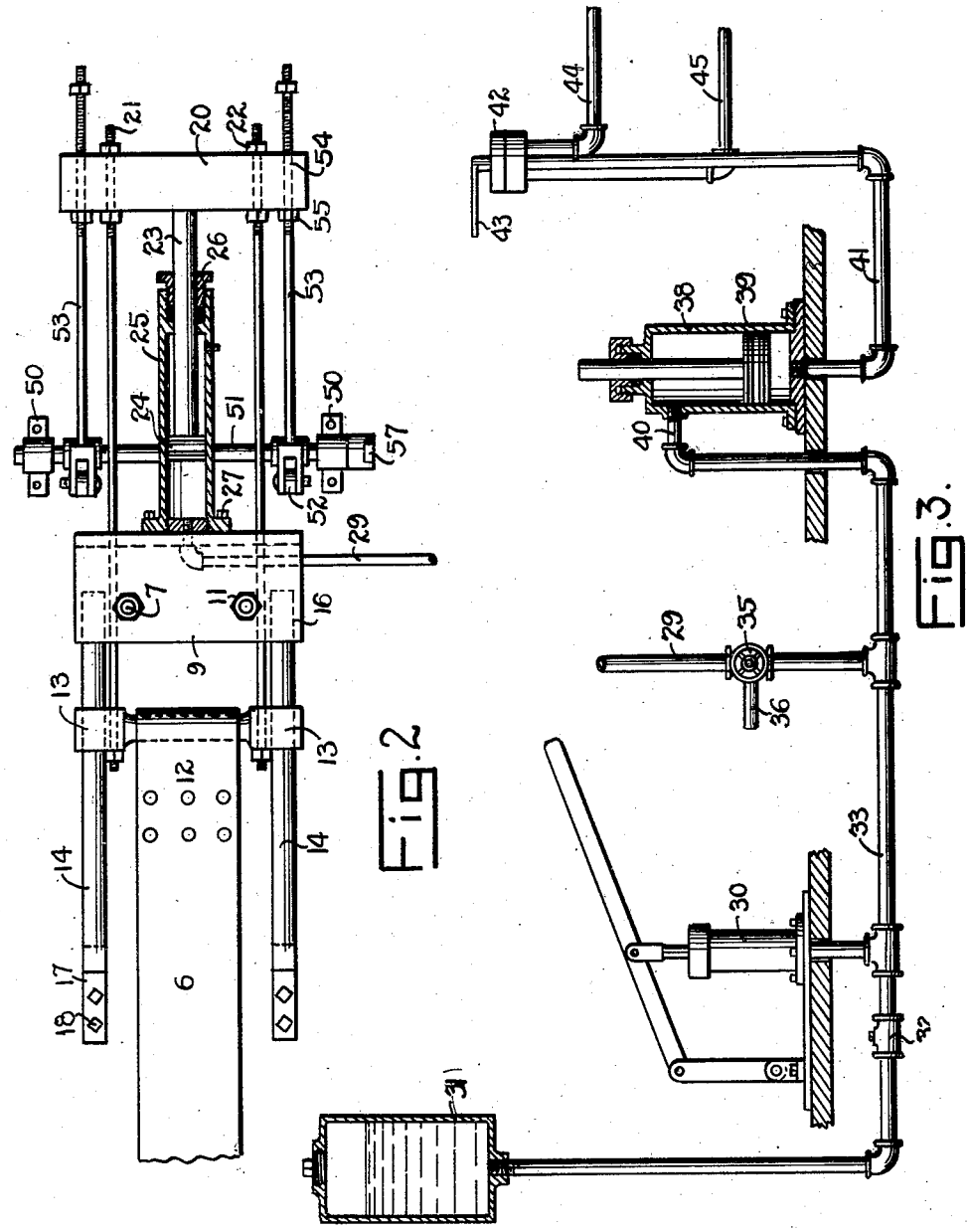
Inventor
ST. CLAIR F. LUZZI
By Jesse R. Stone
Lester B. Clark
Attorneys.

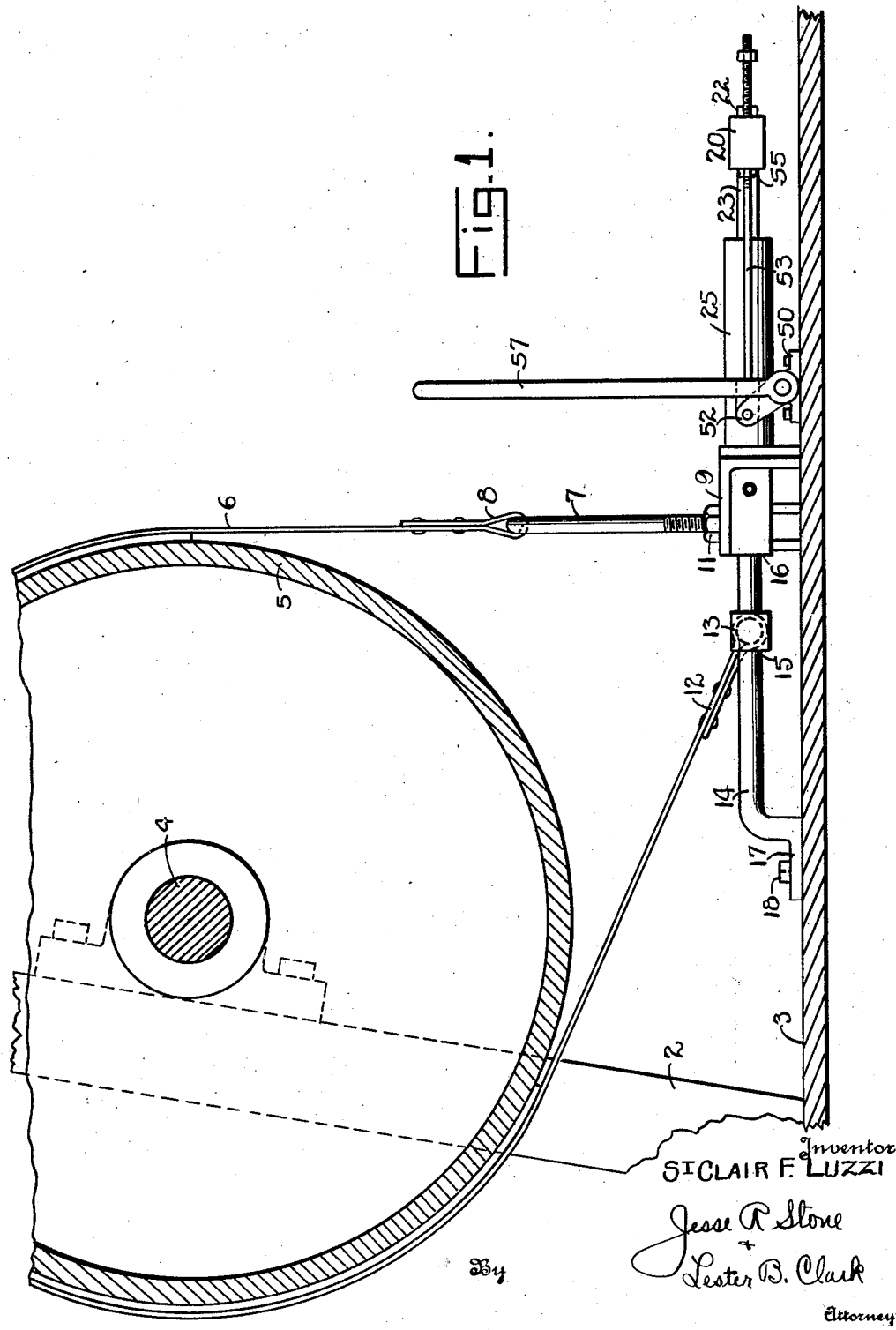

Patented Nov. 24, 1931

1,833,167

UNITED STATES PATENT OFFICE

ST. CLAIR FRANCIS LUZZI, OF HOUSTON, TEXAS, ASSIGNOR OF ONE-HALF TO F. H. THRAILKILL, OF HOUSTON, TEXAS

HYDRAULIC BRAKE FOR DRAW WORKS, DRUMS, AND HOISTS

Application filed March 29, 1930. Serial No. 440,083.

The invention relates to an improvement in hydraulic brake control mechanism.

It is one of the objects of the invention to provide an improvement in connection with the manipulation of brakes and particularly of the type of brake used in connection with the hoisting mechanism on well rigs.

Another object of the invention is to provide hydraulic control for the brake band of a well rig draw works.

A still further object of the invention is to provide a control mechanism for brake bands in which hydraulic pressure may be used to move a cross head attached to the brake band.

It is also an object of the invention to provide a dual hydraulic control for brake bands in which the brake band may be locked in any desired position by trapping a quantity of fluid in the control mechanism.

A still further object of the invention is to provide, in connection with a hydraulic control for brake bands, a manual control which may be used in event of failure of the hydraulic control.

Other and further objects of the invention will be readily apparent when the following description is considered in connection with the accompanying drawings, wherein—

Fig. 1 is a side elevation of one form of the control mechanism as applied to the brake band of a draw works.

Fig. 2 is a top plan view of the mechanism shown in Fig. 1 with the hydraulic cylinder shown in section.

Fig. 3 is a side elevation, with certain parts shown in section, of the dual control mechanism which may be used in practicing the invention.

In Fig. 1 a well derrick is illustrated generally at 2, which derrick includes a floor or other construction 3. Mounted on the derrick or other supporting structure is a draw works 4 which includes as a part thereof the brake drum 5. About this drum is the brake band 6, the control of which constitutes the essential feature of this invention.

In applying a brake band to a brake drum it is usual to anchor one end of the band in a firm position and for this purpose the connection 7 has been provided and the band is illustrated as having been looped about this connection as at 8. The connection 7 is arranged for attachment to a support 9 and is adjustable with respect thereto by means of the nut 11. Thus, if it is desired to change the adjustment of the brake band slightly it may be accomplished by movement of the nut 11 so that the end 8 may be drawn downwardly; thus the band may be more tightly drawn about the brake drum, or in event a new lining is applied to the brake band, the member 7 may be raised to accommodate the additional thickness of the band.

The opposite end 12 of the brake band 6 after passing upon the drum 5 is connected to a cross rod 13. This rod is arranged for sliding movement upon the guide members 14 and may be provided with an opening 15 so that the rod may be fitted onto the bars. The bars 14 are shown as having one end inserted in the support 9 in a recess 16 formed therein. The opposite end of the bars are flattened at 17 and connected to the floor or other support by a fastening means 18. Two of the bars 14 are best seen in Fig. 2 so that the cross rod 13 will be properly positioned and so disposed that it will withstand the enormous thrust necessary in the operation of the brake band.

The cross rod 13 is arranged for movement by means of a cross head 20 by being connected thereto with the rods 21. These rods are adjustable as to length and are connected with the cross head 20 by passing therethru and being positioned with respect to the cross head by the nuts 22. Connected to the cross head 20 is a piston rod 23 which is arranged for movement by having a piston head 24 thereon which is disposed in the cylinder 25. A suitable stuffing box 26 is provided on the end of the cylinder to serve as a bearing for the rod 23. The cylinder 25 is connected to the support 9 as at 27 so that it is positioned in the plane of movement of the cross head 20. Leading into the cylinder 25 is a fluid pressure line 29 which is connected to a suitable source of supply and control so that fluid pressure may be permitted in the cylinder 25 to act against the piston 24 and move the cross head 20 to the right as viewed in Fig. 2.

This lateral movement of the cross head 20 is accompanied by an equivalent movement of the cross rod 13 which serves to tighten the brake band 6 about the drum. When the fluid pressure is released inside of the cylinder 25, it seems apparent that the tension on the band will be released and the brake drum in this manner freed for rotation.

The mechanism for controlling the flow of fluid through the line 29 is best seen in Fig. 3, the lefthand side of this figure showing a device for manually applying the pressure to the fluid. A pump 30 has been shown which is of a reciprocating type and draws its supply of fluid from a tank 31. A check valve 32 is placed in the line to prevent a reversal of the flow of fluid. The discharge from this pump 30 passes through the line 33, and the control valve 35 into the line 29. It is intended that this control valve 35 will be of such construction that a flow may pass therethru into the line 29 or the valve may be so adjusted that discharge from the line 29 may occur through the pipe 36 so that the fluid pressure in the cylinder 25 may be relieved by turning the valve 35, and of such further construction that it may be moved to entirely close the pipe 29. If desired, this line 36 may be connected with the tank 31 so that the fluid will be returned and be available for recirculation.

The righthand side of Fig. 3 shows a power control for the flow of pressure fluid into the line 29 and includes a cylinder 38 containing a piston 39. The discharge from this cylinder is the line 40 which connects with the line 29. The inlet to this cylinder is shown at 41 and connects with a control valve 42. This valve is of such construction that the handle 43 thereof may be moved so that a flow of fluid may pass into the line 41 from the pipe 44, or may be discharged therefrom through the line 45. The fluid passing through the lines 44 or 45 may be steam or compressed air which will tend to raise the piston 39 and discharge from the cylinder 38 any liquid which may be therein above the piston 39. This liquid will flow into the cylinder 25 and cause movement of the piston 24, the rod 23, the cross head 20 and in this manner cause tightening of the brake band. The lines 44 and 45 may be connected to any suitable source of fluid pressure such as a boiler or compressor. The supply of fluid to replenish the cylinder 38 flows from or is drawn from the reserve tank 31.

Figs. 1 and 2 show an emergency or manual control for the cross head 20 which may be utilized when sufficient pressure is not available in the line 29 or when additional pressure is desired to be applied to the cross head 20. This mechanism includes the supporting brakes 50 which serve as bearings for the rock shaft 51. This shaft has connected thereto the arms 52 which are, in turn, connected with the rods 53 which extend laterally and pass through the cross head 20. These rods 53, however, are arranged for sliding movement in the cross head 20 due to the fact that the passages 54 in the cross head are of greater diameter than the rods. A nut 55, however, is placed upon each of the rods and adjusted so that it will abut or be in a position closely adjacent to the cross head 20 when it is in an inoperative position. The rods 53 are of sufficient length to extend a substantial distance beyond the cross head 20 so that when the cross head is moved by hydraulic pressure it will slide along the rods 53. However, if it is desired to move the cross head 20 by the manual brake, it is only necessary to rock the shaft 51 by means of the lever 57 so that the rods 53 are moved to the right as viewed in Fig. 2. The nuts 55 thus cause movement of the cross head in a manner similar to its movement caused by the piston rod 23. This construction enables the operator to have a manual control for the brake as well as the hydraulic control and in event an increased force is needed on the brake band, the hydraulic pressure may be supplemented by the manual operation.

It is intended, in the further development of the invention, that various alterations and modifications may be made without departing from the spirit of the invention as set forth in the appended claims.

What I claim is:

1. A control mechanism for brakes including a cylinder, a piston therein, means to supply pressure fluid to said cylinder to move said piston, a cross head connected to said piston, a brake band, a cross rod connected to one end of said band, a support for said cylinder, a pair of guide bars for said cross rod anchored at one end and connected to said support at the other end, and rods connecting said cross head and said cross rod whereby said band may be contracted by the pressure fluid in said cylinder.

2. A control for pressure operated brakes having a brake band including means to anchor one end of the brake band, movable means connected to the other end of said band, guide bars for said means, a cross head connected to said means and hydraulic pressure means to move said cross head.

3. A control for pressure operated brakes having a brake band including means to anchor one end of the brake band, movable means connected to the other end of said band, guide bars for said means, a cross head connected to said means, hydraulic pressure means to move said cross head and means to supply pressure fluid to said pressure means.

4. In combination with a brake band, a hydraulic control means therefor, including a cross head, a manual control also connected to said cross head, the connection for said manual control including rods slidable with respect to said cross head when said manual control is inoperative.

5. In combination with a brake band, a hydraulic control means therefore, including a cross head, a manual control also connected to said cross head, the connection for said manual control including rods slidable with respect to said cross head when said manual control is inoperative, and means to adjust the position of said manual control rods with respect to said cross head.

ST. CLAIR FRANCIS LUZZI.